United States Patent [19]

Greenwald et al.

[11] E Re. 31,085

[45] Reissued Nov. 23, 1982

[54] COIN CHUTE TO ACCOMMODATE VARIOUS COIN SLIDES HAVING DIFFERENTLY SIZED COINS AND COIN COMBINATIONS

[75] Inventors: Harry Greenwald, Whitestone; Christos Lambiris, New York, both of N.Y.

[73] Assignee: Kidde, Inc., Clifton, N.J.

[21] Appl. No.: 246,646

[22] Filed: Mar. 23, 1981

Related U.S. Patent Documents

Reissue of:

[64] Patent No.: 4,221,285
Issued: Sep. 9, 1980
Appl. No.: 952,124
Filed: Oct. 17, 1978

[51] Int. Cl.[3] ..... G07F 5/08

[52] U.S. Cl. ..... 194/1 G

[58] Field of Search ..... 194/92, 93, 1 E, 1 G, 194/102, DIG. 2, 55

[56] References Cited

U.S. PATENT DOCUMENTS

| | | | |
|---|---|---|---|
| 1,924,618 | 8/1933 | Mills | 194/92 |
| 2,840,215 | 6/1958 | Hensley, Jr. | 194/92 |
| 2,948,379 | 8/1960 | Hensley, Jr. | 194/92 |
| 3,361,241 | 1/1968 | Hall | 194/1 G |
| 3,712,440 | 1/1973 | Greenwald | 194/55 |
| 3,732,962 | 5/1973 | Hall | 194/92 |

*Primary Examiner*—Stanley H. Tollberg
*Attorney, Agent, or Firm*—McAulay, Fields, Fisher, Goldstein and Nissen

[57] ABSTRACT

A coin chute adapted to receive interchangeable coin slides. One type of slide may have one or more coin sockets fitted with one or more knock-out plugs to accommodate differently sized coins in each of the sockets. Another type of slide has either one, two, three or four open coin sockets of different sizes.

The chute carries a blocking device with a plurality of sizing dogs biased against the coin slide. The sizing dogs are adapted to engage with the coin receiving sockets of the slide to jam continued projected movement of the slide in the absence of predetermined size coins therein. The position of the dogs relative to the sockets of the slide and the spacing between the dogs is pre-set to similarly engage with differently sized socket openings of replacement slides without further adjustment of the sizing dogs to permit interchangeable use of coin slides whereby the coin chute is operable to accept a variety of differently sized coins and coin combinations by changing slides.

13 Claims, 15 Drawing Figures

10
12
14
16
18A
18B
18C
18D
20A
20B
22
28
30
40
42
44
45
54
60
62
64
70
72
82
90
96
98
100
102
104
5
6
8
9

COIN CHUTE TO ACCOMMODATE VARIOUS COIN SLIDES HAVING DIFFERENTLY SIZED COINS AND COIN COMBINATIONS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to a coin chute which is operable to accept a variety of differently sized coins and coin combinations by altering or exchanging the coin carrying slide. More specifically, the coin chute includes coin sizing dogs which are arranged to be operatively associated with any one of various coin slides without requiring internal adjustment of said dogs.

2. Description of the Prior Art

Coin controlled timing units are usually installed on commercial appliances such as clothes washers, dryers, vending machines and the like. The coin control is enclosed within a housing mounted on the appliance or machine and the housing is usually provided with a locked coin drawer which prevents unauthorized access to a coin receptacle located in spaced relation to the coin control. The coin control includes a coin chute having a coin slide reciprocally mounted in a guide track for projected and retracted movement. The coin slide is formed having a coin receiving portion whereby the presence of a coin therein is operative to allow projected movement of the coin slide to the operate position thereof. The coin is transmitted to the coin receptacle upon projected movement of the coin slide. The inner end of the coin slide is provided with an operator for actuating the appliance or machine upon continued projected movement of the slide to the operate position thereof.

In the prior art, there are numerous types of coins slide assemblies, such as exemplified by U.S. Pat. No. 3,489,259, which, while fulfilling their intended functions satisfactorily, are not easily adaptable by the vending machine owner to accomodate changes in coin denomination. When such changes in coin denomination are desired, it is common practice to return the coin chute to the manufacture to replace the coin slide with one that will accept the new size coin or coins.

U.S. Pat. No. 3,763,984 overcomes the prior problem of the need to return the coin chute to the manufacturer for coin slide replacement by providing easily adjustable sizing dogs to permit accommodation of various sized coins. However, as well as this device works, it still requires that the vending machine owner make internal adjustments to the sizing dogs of the coin chute whenever a different combination of coins other than that for which the device was originally set, is to be used. The present invention improves further over the prior art in the manner hereinafter described.

SUMMARY OF THE INVENTION

The present invention provides a coin chute which allows the use of a wide combination of coins by merely altering the coin receiving portions of the slide, or replacing the slide with one having differently sized coin receiving portions to accommodate changes in coin denomination for operating the coin slide assembly. In this regard the coin receiving portions are formed having press fitted knock-out plugs which can be selectively removed or punched out of the slide so as to change the denomination of coins required to operate the mechanism. Furthermore, the invention provides for coin size sensing dogs which are pre-positioned to operatively engage with the coin receiving portions of the slide in use, and which do not require further adjustment when making changes in the size of the coin receiving portions of the slide. The invention is applicable to coin slides which carry multiple coins of the same or different denominations as well as to coin slides which carry only a single coin.

Operation of the coin-controlled device without inserting the proper coin or coins into the coin slide is prevented by a blocking means which is responsive to the missing or wrong sized coin to place an obstruction in the path of travel of the coin slide to prevent movement thereof to its operate position. The blocking means is responsive to the presence of the proper coin or combination of coins to remove the obstruction and thereby allow continued projected movement of the coin slide to its operate position for activating the coin-controlled device.

By providing the coin slide assembly with multiple sizing dogs pre-positioned to be operable with any combination of coins received in the coin slide, the device will operate without the need to make internal adjustment to said sizing dogs.

Additional anti-tampering means are provided, such as to prevent the use of magnetic "slugs" to operate the device, and to prevent retrieval of the coins after the mechanism is activated.

For a better understanding of the invention and its various applications and advantages, reference should be had to the following detailed description, when taken in conjunction with the accompanying drawings, which together exemplify a preferred embodiment of the invention.

DESCRIPTION OF THE PREFERRED EMBODIMENT AND OPERATION OF THE DEVICE

Figure 1:
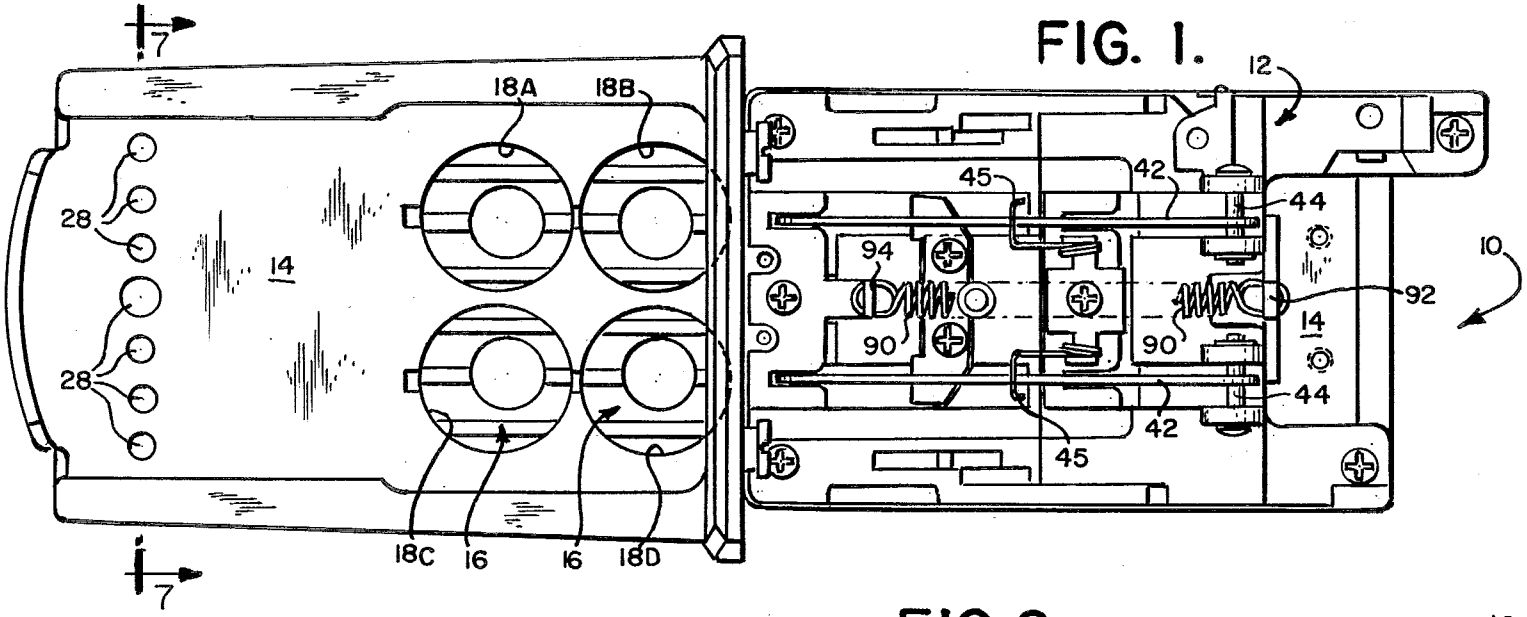
FIG. 1 is a top plan view of a slide assembly according to a preferred embodiment of the invention, as seen with the coin slide retracted ready to receive coins of a selected denomination.
Figure 2:
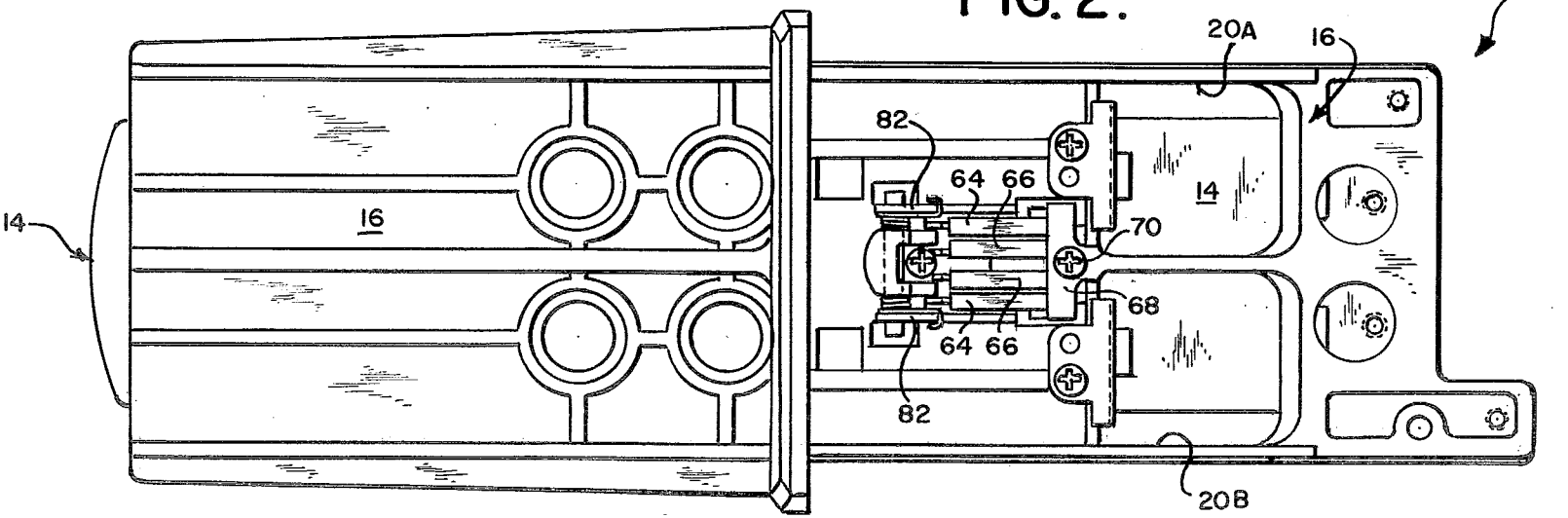
FIG. 2 is a bottom plan view of the coin slide assembly of FIG. 1.
Figures 3, 4, 5:
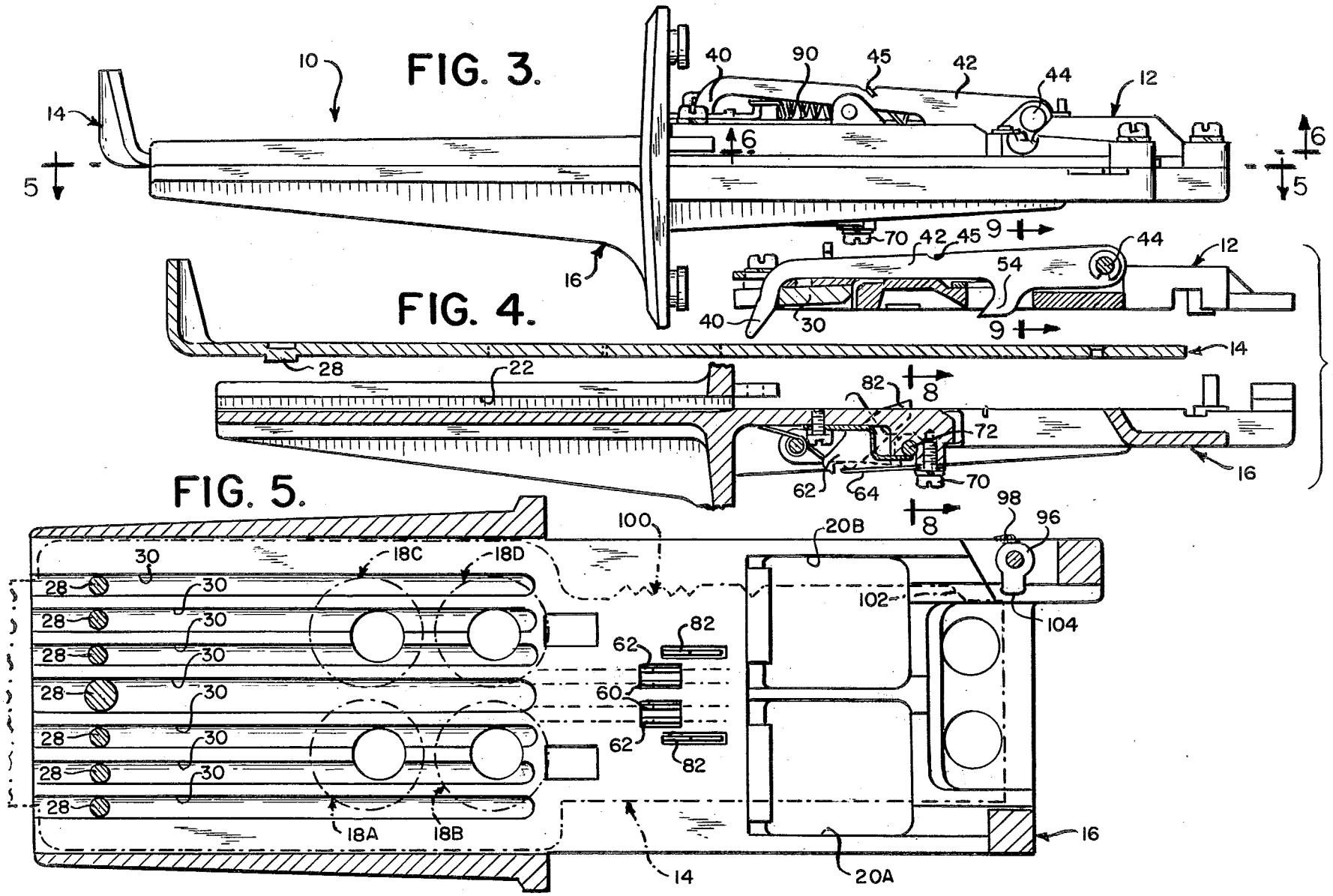
FIG. 3 is a side elevational view of the coin slide assembly of FIG. 1.
FIG. 4 is a longitudinal exploded sectional view of the coin slide assembly of FIG. 1.
FIG. 5 is a top plan view of the lower portion of the coin slide assembly of FIG. 1 taken along line 5—5 of FIG. 3, with the coin slide shown in phantom to illustrate its position relative to said lower portion of the assembly.

With reference to FIGS. 1, 2 and 4, a coin operated device 10 is composed of three (3) basic structures: an upper assembly portion 12 a coin slide 14 and a lower assembly portion 16.

The upper and the lower portions 12, 16 form a slide chute and define therebetween a longitudinal coin slide guide track passage to receive and guide movement of the coin slide 14 between its projected and retracted positions.

As shown in FIG. 1, the coin slide 14 is in its retracted position wherein the coin receiving sockets 18A, 18B, 18C and 18D are outside of the guide passage awaiting receipt of the appropriate coins. The coins are supported in these sockets 18 (A–D) by the lower assembly 16. When the coin slide 14 is pushed into the guide passage to its fully projected position, the coin sockets 18(A–D) are disposed over coin discharge openings 20A, 20B (see FIG. 5) to permit the coins carried by the slide 14 to fall therethrough into a coin recepticle or box (not shown) spaced below the coin operated device 10.

Figure 7:
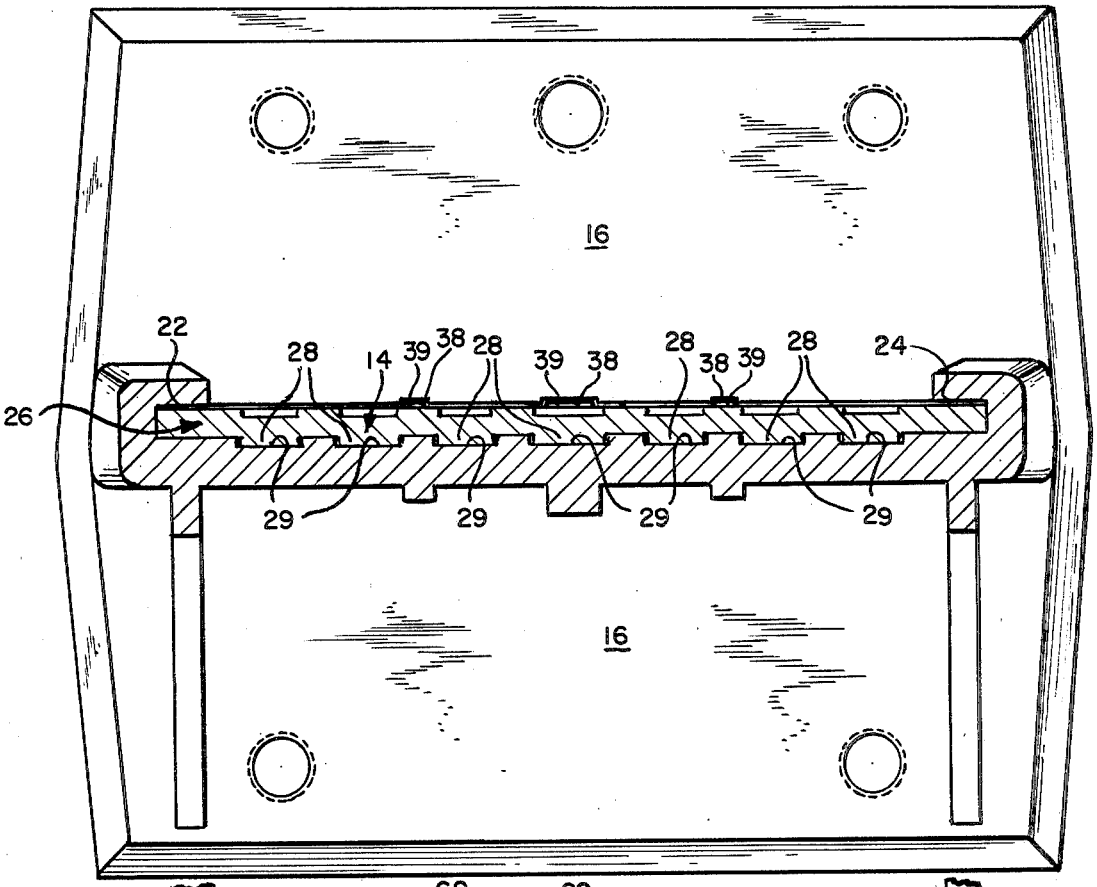
FIG. 7 is a cross-sectional view of the coin slide assembly of FIG. 1 taken along line 7—7 of FIG. 1.

As can best be seen in FIG. 7, in the retracted position the coin slide 14 is supported by the lower assembly 16 and is held along its edges by opposed grooves 22, 24 formed by the lower assembly 16. To prevent the use of coin holding shims which would stop coins from falling through the coin receiving openings 20A, 20B an anti-coin holding shim structure 26 is provided. This structure is formed by a series of projections 28 extending downwardly from the bottom of the coin slide 14 and riding in a matching series of closely fitted elongated slots 29 formed in the lower assembly 16 (FIGS. 5 and 7). As can readily be seen from FIG. 7, this structure will prevent the insertion of a shim along the bottom on the coin slide 14.

Figure 6:
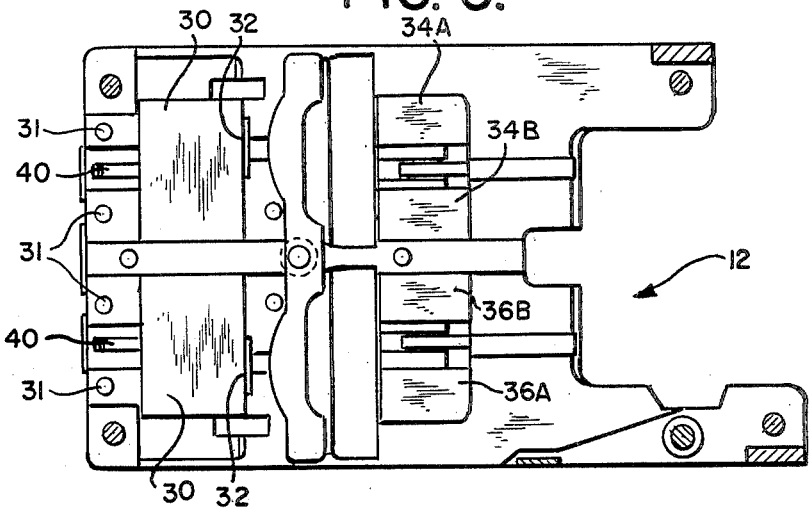
FIG. 6 is a bottom plan view of the upper portion of the coin slide assembly of FIG. 1 taken along line 6—6 of FIG. 3.

Referring to FIG. 6, in order to prevent the use of metal "slugs" to operate the device, magnets 30 and associated jamming edge 32 are provided on the forward portion of the upper assembly 12. Basically, the magnets 30 are inclined upwardly toward the back portion of the upper assembly 12 to expose a wall or jamming edge 32, so that a slug, partially drawn out of its socket 18 by the magnet 30, will be forced into abutment with the jamming edge 32 and jam the slide. In the event that the slugs are jiggled or otherwise forced passed the first magnets 30, a set of magnets split into two pairs 34 A, B, and 36 A, B, are provided over the coin receiving openings 20A, B to prevent the slugs from falling into the coin box. Although this does not prevent the coin operated machine from being triggered into operation, it does jam the coin slide by the action of anti-coin return dogs, to be discussed below, thereby preventing the further wrongful use of the machine.

With reference to FIG. 7, because it may be necessary to provide means to prevent insertion of shims between the top of the coin slide 14 and the portion of the lower assembly 16 which is disposed just above the coin slide 14, provision is made in this portion of lower assembly 16 to receive projections 39 which may be formed on the top of the coin slide 14. This is in the form of elongated slots 38 which operate with projections 39, in a manner similar to the operation of the elongated slots 29 in conjunction with projections 28 to prevent the use of (coin holding) shims along the bottom of the slide 14.

A second anti-shim means is also provided in the form of tapped openings 31 formed in the upper assembly as shown in FIG. 6. These openings can be provided with spacing screws (not shown) which can be inserted and screwed downwardly into close proximity to the top surface of slide 14. This provides a simple means to adjust the clearance above the slide 14 after the coin operated device 10 has been installed in an appliance.

Either of these two anti-shim provisions, or both, may be used as necessary or as desired.

In order to prevent the use of a washer in place of a coin in the coin slide, as is sometimes attempted by persons trying to operate the coin chute without use of a proper coin, a center sensing dog 40 is provided. As can be seen in FIG. 4, the sensing dog 40 is carried on an arm 42 which is disposed to pivot about pin 44 and be biased downwardly by spring 45. The inter-relationship among these parts can be seen by a comparison of FIGS. 1, 3 and 4. As can be seen in FIG. 1, an identical set of compenents is provided for each line of coin holding sockets 18A, 18B, 18C, 18D in the coin slide 14.

Figures 9, 10, 11, 12, 13, 14, 15:
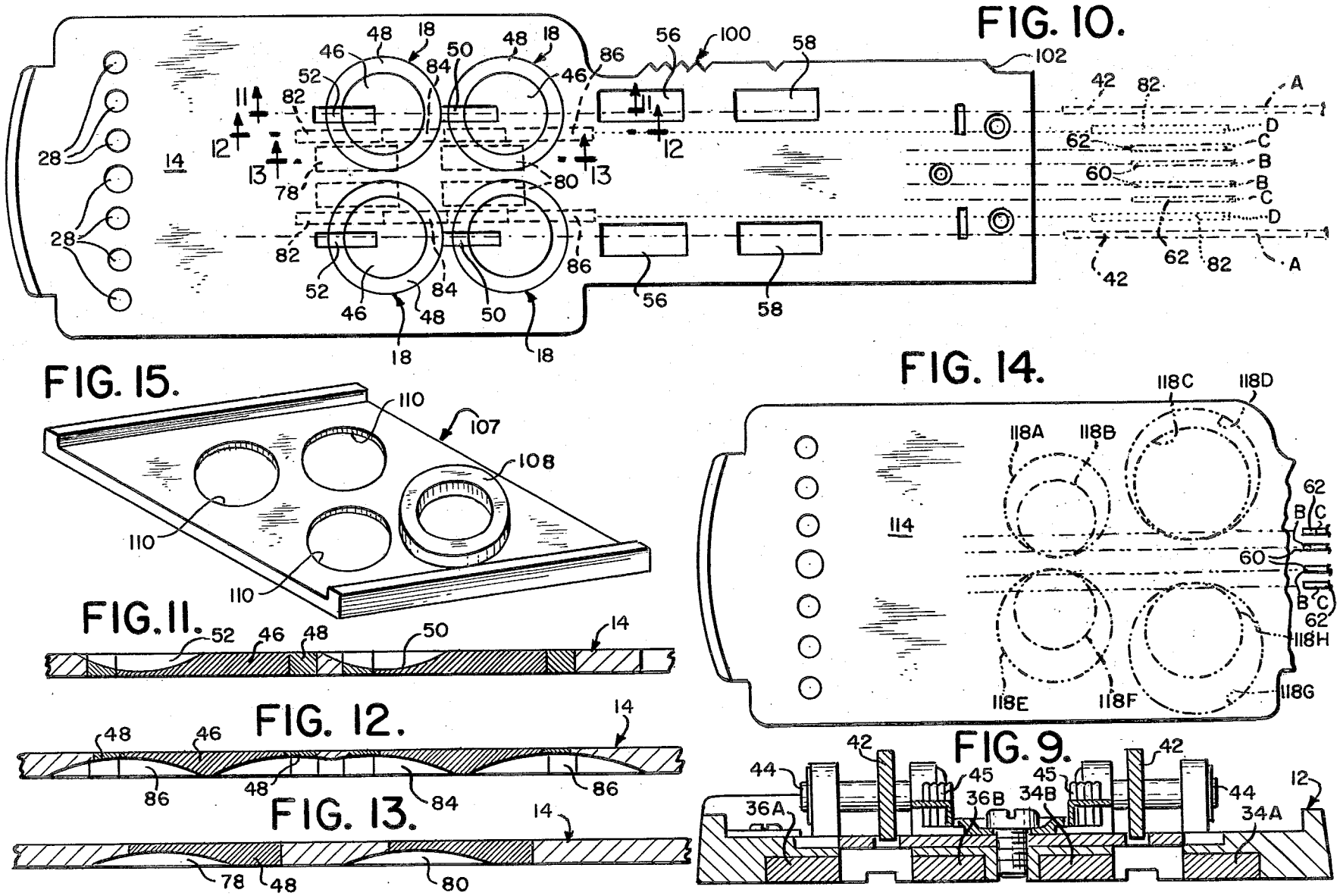
FIG. 9 is a cross-sectional view of the upper portion of the coin slide assembly according to FIG. 1 taken along line 9—9 of FIG. 4.
FIG. 10 is a top plan view of a coin slide similar to the one shown in FIG. 1, with the location of the various coin sizing dogs shown in phantom.
FIG. 11 is a longitudinal sectional view of the coin slide of FIG. 10 taken along line 11—11 of FIG. 10.
FIG. 12 is a longitudinal sectional view of the coin slide of FIG. 10 taken along line 12—12 of FIG. 10.
FIG. 13 is a longitudinal sectional view of the coin slide of FIG. 10 taken along line 13—13 of FIG. 10.
FIG. 14 is a partial plan view of an interchangable coin slide wherein different slides are required to change coin denomination, showing, in phantom, the positioning of various coin receiving portions or openings for accepting a variety of differently sized coins and coin combinations to permit such openings to be operatively associated with the pre-positioned sizing dogs shown in phantom without requiring adjustments to the sizing dogs.
FIG. 15 is a plug removal tool guide to be used in combination with a punch or other similar object to remove the press fitted plugs of the coin receiving portions of a slide to change the denomination of the coins required to operate the device.

The operation of the center sensing dog 40 can be easily understood from FIG. 10, wherein the relative location of the sensing dog 40 with respect to the coin slide 14 is shown at A. Upon projected movement of coin slide 14, the sensing dog 40 passes over the middle of the coin holding socket 18. The coin slide illustrated in FIG. 10 has not had any of its press fitted plugs 46, 48 removed to accept the coins. However, if the plugs were removed and a washer were present in one of these sockets 18 then, upon projected movement of the coin slide 14, the sensing dog 40 would be biased downwardly into the central opening of the washer, under the influence of spring 46, and prevent further projected movement of the coin slide. If a solid coin is present in a socket 18, the sensing dog 40 will ride over the coin and thus be displaced out of its blocking position.

In the event that a proper coin is not sufficiently high to clear the upper lip of the socket 18, a small inclined guide 50, 52 is provided at the trailing edge of each socket 18 to permit the sizing dog 40 to pass over the coin and ride up the inclined guide during continued projected movement of the slide. The inclined guides 50, 52 are conveniently formed by providing a partial circular groove in the slide, as can be seen from FIG. 11. This is mainly a preferred configuration from the point of view of manufacture, as any inclined guide surface would serve the same purpose.

Because the sensing dogs 40, 40 are slightly rounded to allow them to conveniently ride over the coins, it has been found preferable to provide an additional locking means in the form of locking dogs 54, 54 to jam the slide when the sensing dog 40, 40 are in their downwardly biased position. As can be seen in FIG. 4, locking dog 54 is carried on the same arm 42 that carries the sensing dog 40. The locking dogs 54, 54 are also located at A, A as shown in FIG. 10; however, they are spaced away from the center-sensing dog 40, 40, a predetermined distance. The arrangement is such that when the sensing dog 40, 40 are in the center of socket 18, as when someone inserts a washer into the socket or when the socket is empty of a coin, the locking dogs 54, 54 will interlock with one of the locking slots 56, 58 formed in the coin slide 14, depending on which socket 18,18 the center sensing dog 40 has dropped into. Locking slots 56, 58 are preferably rectangular openings formed through the coin slide 14.

Figure 8:
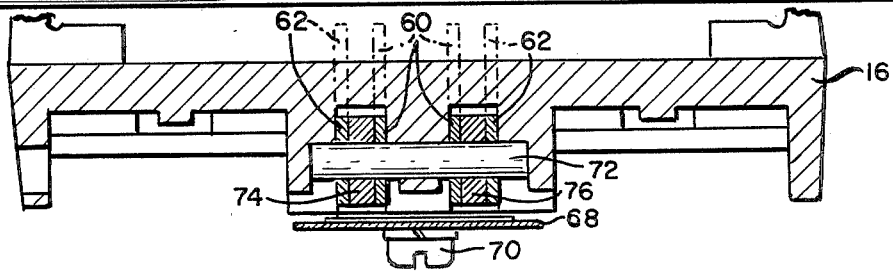
FIG. 8 is a cross-sectional view of the lower portion of the coin slide assembly of FIG. 1 taken along line 8—8 of FIG. 4.

To insure that coins of the proper diameter are used in the coin slide 14, a pair of sizing dogs 60, 62 are associated with each row of sockets 18A, 18B, 18C, 18D. In the preferred embodiment shown in the drawings, these sizing dogs 60, 62 are carried by the lower assembly 16 as shown in FIGS. 4 and 8. The sizing dogs 60, 62 are biased upwardly by leaf springs 64, 66 as shown in FIG. 2. FIG. 4 shows the upward biasing interaction between leaf spring 64 and sizing dog 62. The leaf springs 64, 66 are secured to the lower assembly 16 by bracket 68 and a screw 70. With reference to FIG. 8, the dogs 60, 62 pivot about a shaft 72 and have a spacer 74, 76 therebetween.

For the proper operation of the sizing dogs 60, 62, their position relative to sockets 18 in the coin slide 14 is important. It is this relationship which permits changing the denomination of the coins used in the coin slide 14 without the need for adjusting the position of the sizing dogs 60, 62. As shown in FIG. 10, the sizing dogs are located at B, B and C, C. The position C, C passes over the outer press-fit knockout plugs 48 in the sockets 18 and the position B, B passes over the outer edge of the inner press fit knockout plugs 46. Thus, it does not matter whether a coin receiving portion of the slide has had one or two of its associated press fit plugs removed as there will always be at least one sizing dog 60, 62 disposed near the edge of the socket 18 to sense whether the entire space is essentially filled with a coin. If the space is not essentially filled with a coin, the appropriate dog 60, 62 will be biased upwardly by leaf springs 64, 66 and abut the inner edge of the socket 18 to jam the slide 14 upon continued projected movement of the slide. If only the inner press fit plug 46 has been removed, the outer dog 60 will be prevented from jamming the slide by the presence of the outer ring 52.

Alternatively, if interchangable slides are used rather than slides having press fit plugs, different configurations for the position of various sockets can be used. FIG. 14 shows a coin slide 114 with a number of different possible coin sockets 118 (A–H) shown in phantom so that the relationship between the various sizing dog positions B, C with respect to these different socket sizes and positions can be seen. As is shown in FIG. 14, the coin sockets, irrespective of size, must have an edge through which one of the sizing dogs passes. This insures that regardless of the coin size, the sizing dogs will be operative without adjustment. Thus, either coin slides with knockout plugs (FIG. 10) or with sockets as shown in FIG. 14, may be used without requiring adjustment of the sizing dogs.

As with the center sensing dogs 40, it is preferable to provide sizing dogs 60, 62 with inclined sizing dog guides 78, 80 extending rearwardly from each socket 18 to permit easy travel of the sizing dogs 60, 62 away from the sockets 18 when a coin is present.

The preferred embodiment of the coin chute 10 also includes anti-coin return dogs 82 (FIG. 4). With reference to FIG. 10, these are in position D,D and have as their function the prevention of movement of coin slide 14 to its retracted position in an attempt to retrieve the coin after the appliance or timing mechanism has been activated. This may be achieved, for example, by taping the coin in place.

With reference to FIG. 10, the anti-coin return dogs 82 are pivotally mounted and located at positions D, D, and are spring biased to project into the intermediate portion of the sockets 18. Each anti-coin return dog 82 rides in aligned anticoin return dog guides 84, 86, 88 provided in the coin slide 14. The return dogs 82 bear against the rear edge of the coin in the socket upon retracted movement of the slide to jam the slide and prevent further retracted movement thereof.

Not only do the anti-coin return dogs prevent the return of coins which have been taped or otherwise stuck in the sockets so that they do not fall through the coin discharge openings 20A, 20B, but they also act in conjunction with the coin magnet pairs 34A, 34B, 36A, 36B to jam the coin chute 10 when magnetic slugs are used in the device. As was noted in the discussion above with respect to the magnet pairs 34A, 34B, 36A, 36B, the magnets are positioned above the coin discharge opening 20A, 20B to prevent slugs from dropping into the coin box if the slugs should be jiggled passed the first magnets 30, 32. In this case, although the coin operated appliance mechanism will be actuated once by the slugs, the retention of such slugs in the sockets by the magnet pairs will cause an edge of the slugs to bear against the anti-coin return dog and jam the chute upon projected movement of the coin slide. This prevents further operation of the device until the slugs are removed from the mechanism.

In order to bias the coin slide 14 into its retracted position, a spring 90 is disposed between a bracket 92 on the coin slide 14 and a post 94 on the upper assembly, as shown in FIG. 1. The bracket 92 projects upwardly from the end of the coin slide 14 and further acts as a stop member in that it abuts the upper assembly 12 when the coin slide is in its fully retracted position to prevent removal of the coin slide from the coin chute mechanism.

Once the coin slide 14 has been advanced in a projected direction a predetermined distance, a ratchet mechanism serves to prevent retracted movement of the slide until after the slide has been moved to its fully projected position to deposit the coins in the coin box. As can be seen in FIG. 5, the ratchet mechanism includes a pawl 96 carried on the lower assembly 16 and biased by a spring 98 in the direction against an edge of coin slide 14. The pawl 96 coacts with notches 100 formed along the edge of the coin slide 14. When the coin slide 14 is pushed toward its fully projected position the pawl 96 is pivoted in a counter-clockwise direction by a shoulder 102 formed on the leading end of the slide 14. This causes the pawl 96 to ride on the edge of the slide 14 with its flat edge 104 facing generally rearwardly. As can readily be realized, once the pawl 96 rides into the first notch 100 any attempt to pull the slide 14 into its retracted position will be prevented by the jamming of the flat end 104 of the pawl 96 into one of the notches 100. Once the pawl 96 rides passed the last notch 100, when slide 14 is in its fully projected position, pawl 96 is biased into a neutral position from which it is pivoted in a clockwise direction by the lowermost notch 100 upon retracted movement of slide 14. In such position; flat edge 104 faces rearwardly and rides over the notches to permit retracted movement of the table. However now the engagement of flat edge 104 is such to prevent projected movement of the slide until after the slide is fully retracted to receive additional coins.

FIG. 15 shows a plug removal tool guide 107. The guide has a raised collar 108 to fit into an open socket of a coin slide, thereby to mount the coin slide on the guide. The openings 110 can then be used as a guide or die for a punch or similar object, to aid in the removal of one or more of the press fit plugs 50, 52 from the slide by exertion of a force against the plugs 50, 52.

From the disclosure of a preferred embodiment of the invention given herein, it will become apparent to the artisan that the invention can be modified in many obvious ways as are suggested by the particular requirements of use. For example, the spacing between the dogs in each pair 60, 62 may be varied as required by the coins in different countries. In the U.S., a usual large coin is a quarter and a usual small coin is a dime. Assuming a concentric socket arrangement as shown in FIG. 10, the distance between the sizing dogs would therefore be one-half the difference in diameters of these coins or about one-eighth inch. There may also be other variation in the design and arrangements of various elements which comprise the invention, which would be obvious to an artesian.

It is therefore intended that the scope of the invention be only as provided in the following claims.

What is claimed is:

1. In a coin chute device wherein there is, in combination, a lower assembly portion; an upper assembly portion releasably connected to said lower portion and defining therewith a longitudinal guide track passage; and a coin slide having first and second coin sockets to carry predetermined sized coins; said guide passage being operable to receive said coin slide for reciprocal movement between projected and retracted positions therein; and blocking means mounted on said chute to block movement of said slide in the absence of the predetermined sized coins in said sockets; the improvement comprising:

said first coin socket defining a first path upon reciprocal movement of said coin slide;

said second coin socket defining a second path upon reciprocal movement of said coin slide;

said second coin socket being larger than said first coin socket; and said first socket being so located with respect to said second socket as to define said first path within said second path;

said blocking means including;

a first sizing dog biased against said coin slide and disposed along said first path, said first sizing dog being operable, in the absence of a first sized coin or other filler in said first socket, to project into said first coin socket to jam said coin slide; and a second sizing dog biased against said coin slide and disposed along said second path, said second sizing dog being operable, in the absence of a second predetermined sized coin or other filler in said second socket, to project into said second socket to jam said coin slide to permit interchangeable use of coin slides having said first socket or said second socket without requiring adjustment of said sizing dogs for their operation.

2. The device of claim 1 wherein:

each said sizing dog is carried on said lower portion and includes an associated leaf spring to bias upwardly each sizing dog; and a pivot shaft, said first and second sizing dogs being paired together on said pivot shaft with a first spacer pivotally mounted therebetween.

3. In a coin chute device wherein there is, in combination, a lower assembly portion; an upper assembly portion releasably connected to said lower portion and defining therewith a longitudinal guide track passage; and a coin slide having sockets to carry predetermined sized coins; said guide passage being operable to receive said coin slide; said coin slide being disposed for reciprocal movement between projected and retracted positions in said guide passage; and blocking means mounted on said chute to block movement of the slide in the absence of the predetermined sized coins in the sockets; the improvement comprising:

said blocking means including;

a first sizing dog biased against the coin slide and disposed along a first path defined by the movement of an edge portion of a first predetermined sized coin carried in a first predetermined sized coin socket when the coin slide is reciprocally moved, whereby the absence of a first sized coin or other filler along said first path in the socket will permit said first sizing dog to project into the first predetermined sized coin socket to operate to jam said coin slide; and a second sizing dog biased against the coin slide and disposed along a second path defined by the movement of an edge portion of a second predetermined sized coin larger than said first coin carried in a second predetermined sized coin socket larger than said first socket and including said first socket within its extent when the coin slide is reciprocally moved, whereby the absence of a second predetermined sized coin or other filler in the socket along said second path, will permit said second sizing dog to project into the second socket to operate to jam said coin slide;

to permit interchangeable use of coin slides with either said first socket or said second socket, in conjunction with said coin chute, without requiring adjustment of said sizing dogs for their operation; said coin slide comprising:

a first knock-out plug; and a second knock-out plug, said second plug forming a ring about said first plug;

the removal of said first plug forming said first socket and the removal of said second plug forming said second socket, whereby the coin to be carried in said coin slide can be predetermined.

4. The device of claim 3 wherein;

said blocking means further comprises third and fourth sizing dogs biased against said coin slide and disposed along third and fourth paths respectively, said third and fourth paths being defined by the movement of an edge portion of third and fourth predetermined sized coins respectively, which coins are carried in third and fourth predetermined sized coin sockets of said coin slide when the coin slide is reciprocally moved, said fourth socket being larger than said third socket and including said third socket in its extent;

whereby the absence of the third and the fourth coins or other filler in the third or fourth sockets, respectively, will permit said third and said fourth sizing dog, respectively, to project into said third or said fourth socket and operate to jam said coin slide; said coin slide further comprising:

a third knock-out plug; and a fourth knock-out plug forming a ring about said third plug;

the removal of said third plug forming said third socket; and the removal of said fourth plug forming said fourth socket;

whereby the coin or coin combination carried in said coin slide can be predetermined.

5. The device of claim 4 wherein:

each said sizing dog is carried on said lower portion and includes an associated leaf spring to bias upwardly each sizing dog; and a pivot shaft, said first and second sizing dogs being paired together on said pivot shaft with a first spacer pivotally mounted therebetween, and said second and third sizing dogs being paired together on said pivot shaft with a second pivotally mounted spacer therebetween.

6. The combination of claim 3 or 4 further including:

a plug removal tool guide, said tool guide comprising:

a raised collar portion of substantially the same size as one of said sockets and adapted to be received therein to mount said coin slide on said guide; and said guide having at least one opening serving as a die for a punch device to facilitate removal of one of said plugs as a result of a force exerted against said one of said plugs by said punch.

7. The combination of claim 4 wherein said coin slide includes fifth and sixth sockets and fifth and sixth knock-out plugs filling said fifth and sixth sockets respectively whereby the removal of either said fifth or sixth plug will form its respective socket, said fifth and sixth knock-out plugs being aligned with said first and second knock-out plugs along said first and second paths, respectively, whereby said fifth and sixth sockets are disposed for use in conjunction with the operation of said first and second sizing dogs.

8. The combination of claim 7 wherein said coin slide further includes seventh and eighth sockets and seventh and eighth knock-out plugs filling said seventh and eighth sockets, respectively, whereby the removal of either said seventh or eighth plug will form its respective socket, said seventh and eighth knock-out plugs being aligned with said third and fourth knock-out plugs along said third and fourth paths, respectively, whereby said seventh and eighth sockets are disposed for use in conjunction with the operation of said third and fourth sizing dogs.

9. The combination of claim 8 wherein said first and second sockets, said third and fourth sockets, said fifth and sixth sockets and said seventh and eighth sockets, respectively, are concentric.

*10. In a coin chute device where there is, in combination, a housing having a guide track passage; and a coin slide disposed for reciprocal movement between projected and retracted positions in said guide track; wherein the improvement comprises:*

*said coin slide having a first coin socket;*

*said slide further having at lease one removable plug forming a ring about said first coin socket to define the perimeter of said socket when said plug is in place;*

*said coin slide having a second coin socket formed by the removal of said plug;*

*said first and second sockets being sized to carry first and second predetermined sized coins;*

*said second coin socket being larger in perimeter than said first coin socket, the perimeter of said first socket lying within the perimeter of said second socket; and*

*blocking means mounted on the chute and positioned to engage said slide to block movement of said slide in the absence of a predetermined sized coin in either of said first or second sockets.*

*11. In a coin chute device where there is, in combination, a housing having a guide track passage; and a coin slide disposed for reciprocal movement between projected and retracted positions in said guide track passage; wherein the improvement comprises:*

*said coin slide having a first removable plug and a second removable plug, said second plug forming a ring about said first plug;*

*the removal of said first plug forming a first socket in said coin slide and the removal of said second plug forming a second socket in said coin slide, said first and second sockets being sized to carry first and second predetermined sized coins;*

*said second socket being larger than said first socket and including said first socket within its peripheral extent; and*

*blocking means mounted on the chute and positioned to engage said slide to block movement of said slide in the absence of a predetermined sized coin in at least one of said first and second sockets.*

*12. The combination of claim 11 further including a plug removal tool guide, said tool guide comprising a raised collar portion of substantially the same size as one of said sockets and adapted to be received therein to mount said coin slide on said guide; and said guide having at least one opening serving as a die for a punch device to facilitate removal of one of said plugs as a result of a force exerted against said one of said plugs by said punch.*

*13. The combination of claim 10 or 11 wherein said first and second sockets are concentric.*

* * * * *